United States Patent
Moni et al.

(10) Patent No.: US 7,636,392 B2
(45) Date of Patent: *Dec. 22, 2009

(54) NON-COMPENSATED TRANSCODING OF A VIDEO STREAM

(75) Inventors: Shankar Moni, San Jose, CA (US); Andrew W. Walters, San Jose, CA (US); John A. Tardif, San Jose, CA (US); Padma Parthasarathy, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

This patent is subject to a terminal disclaimer.

(21) Appl. No.: 10/968,252

(22) Filed: Oct. 19, 2004

(65) Prior Publication Data

US 2005/0078748 A1 Apr. 14, 2005

Related U.S. Application Data

(63) Continuation of application No. 09/880,243, filed on Jun. 13, 2001, now Pat. No. 6,950,463.

(51) Int. Cl.
*H04N 7/12* (2006.01)
*G06K 9/36* (2006.01)

(52) U.S. Cl. .................... 375/240.03; 382/239
(58) Field of Classification Search ............ 375/240.03, 375/240.02, 240.22, 240.11, 240.19, 240.24; 386/109; 713/160; 382/239
See application file for complete search history.

(56) References Cited

U.S. PATENT DOCUMENTS

| | | | |
|---|---|---|---|
| 5,602,589 A * | 2/1997 | Vishwanath et al. | ... 375/240.11 |
| 5,719,986 A * | 2/1998 | Kato et al. | ................. 386/109 |
| 6,441,754 B1 | 8/2002 | Wang | |
| 6,505,299 B1 * | 1/2003 | Zeng et al. | ................... 713/160 |
| 6,587,508 B1 * | 7/2003 | Hanamura et al. | ..... 375/240.24 |
| 6,628,839 B1 | 9/2003 | Komiya | |
| 6,668,088 B1 * | 12/2003 | Werner et al. | ............... 382/239 |
| 6,757,648 B2 | 6/2004 | Chen | |
| 6,763,067 B2 | 7/2004 | Hurst | |
| 6,950,463 B2 * | 9/2005 | Moni et al. | ............ 375/240.03 |

OTHER PUBLICATIONS

Office Action dated Aug. 3, 2004 cited in U.S. Appl. No. 09/880,243.

(Continued)

*Primary Examiner*—Gims S Philippe
(74) *Attorney, Agent, or Firm*—Workman Nydegger

(57) ABSTRACT

Systems and methods for transcoding a transport stream or a video stream. A video stream includes a quantization matrix and a quantization scale that define how DCT frequency coefficients are quantized. A transport stream is transcoded by updating the quantization matrix and/or the quantization scale such that a new set of DCT frequency coefficients may be generated. Typically the quantization scale and/or the quantization matrix are updated such that the DCT frequency coefficients are more coarsely quantized such that their encoding consumes fewer bits. The quantization matrix can be updated such that select frequency coefficients are affected. Transcoding can operate at any level of the video stream, such as the frame level, the slice level, or the macroblock level. The bit rate of the video stream can therefore be adjusted or altered according to a current quantization level and a current bit rate.

11 Claims, 5 Drawing Sheets

OTHER PUBLICATIONS

Office Action dated Jan. 26, 2005 cited in U.S. Appl. No. 09/880,243.
Notice of Allowance dated Mar. 21, 2005 cited in U.S. Appl. No. 09/880,243.

Supplemental Notice of Allowability dated Jun. 21, 2005 cited in U.S. Appl. No. 09/880,243.

* cited by examiner

NON-COMPENSATED TRANSCODING OF A VIDEO STREAM

CROSS-REFERENCE TO RELATED APPLICATIONS

The present application is a continuation application of commonly-assigned U.S. patent application Ser. No. 09/880,243 filed Jun. 13, 2001, entitled "Non-Compensated Transcoding of a Video Stream" which is incorporated herein by reference.

BACKGROUND OF THE INVENTION

1. The Field of the Invention

The present invention relates to systems, methods, and computer program products for transcoding transport or video streams. More particularly, the present invention relates to systems, methods, and computer program products for reducing a bit rate of a video or transport stream by generating a new set of discrete cosine transform (DCT) frequency coefficients.

2. Background and Related Art

Digital video signals have several significant advantages over their analog counterparts. They can be transmitted over long distances and stored without degradation. They can be encrypted and otherwise processed for purposes such as security and unnecessary or redundant information can be removed from the digital video signals. One cost, however, of digital signals is related to the bandwidth that they consume. More specifically, uncompressed digital or video signals can consume significant bandwidth. This is particularly a problem in situations where multiple digital signals are being broadcast or where the digital signal is being transmitted over a medium such as the Internet, which has limited bandwidth in many circumstances.

This problem has been partially solved through the use of compression. One compression scheme is defined by the Moving Pictures Expert Group (MPEG). The bit stream defined by MPEG is the output of an encoding process that is designed to significantly compress the video picture information. As the MPEG standard only defines the syntax of the resulting bit stream, the standard is flexible enough to be used in a variety of different situations, such as satellite broadcast services, cable television, interactive television services, and the Internet.

The MPEG encoding process generally occurs as follows. A video signal is sampled and quantized to define color and luminance components for each pixel of the digital video. Values representing the color and luminance components are stored in structures known as macroblocks. The color and luminance values stored in the macroblocks are converted to frequency values using a discrete cosine transform (DCT). The transform coefficients obtained from the DCT represent different frequencies in the brightness and the color of the picture.

The MPEG encoding process takes advantage of the fact that human visual system is insensitive to high frequencies in color and luminance changes, and quantizes the transform coefficients to represent the color and luminance information by smaller or more coarsely scaled values. The quantized DCT transform coefficients are then encoded using run level (RLC) and variable length coding (VLC) techniques, which further compress the video stream. The MPEG standard also provides additional compression through motion compensation techniques.

However, even compressed video or MPEG streams may still have a bit rate that is unsatisfactorily high for certain applications, and therefore there is a need to further compress the video stream or reduce the bit rate of the stream. One solution to this problem is to transcode the MPEG stream by completely decoding the MPEG stream and then re-encoding the MPEG stream at a higher compression ratio to reduce the bit rate to an acceptable level. However, transcoding an MPEG stream in this fashion is often computationally expensive because of the need to perform an inverse quantization and an inverse DCT to recreate an approximation of the original data prior to re-encoding the data in accordance with a desired bit rate. Transcoding a video stream is even more complex when motion estimation and compensation are performed.

As previously stated however, transcoding a video stream is often necessary because the bit rate of the incoming video stream may be higher than the available bandwidth or the bit rate of the incoming MPEG stream may be higher than the optimal bit rate for storage of the video stream on a storage medium such as a hard disk drive. In view of these and other problems presented by video streams, minimally complex systems and methods are needed for transcoding a video stream.

BRIEF SUMMARY OF THE INVENTION

The present invention provides a low complexity approach for transcoding a video stream to reduce a bit rate of a previously compressed video stream. The present invention further provides the ability to store or alter a video stream such that the video stream complies with a user defined or otherwise specified quality level. Thus, reducing the bandwidth consumed by the transport or video stream and memory management are exemplary advantages of the present invention.

A video stream is transcoded by re-quantizing previously quantized transform frequency coefficients, without performing inverse quantization and inverse transform operations. This enables the video stream to be compressed to an acceptable bit rate without incurring the additional complexity of the inverse quantization and inverse transform operations. Although the present invention is described with reference to MPEG, the systems and methods described herein is applicable to any type of transform (such as wavelet and DCT transforms) that is followed by a form of quantization.

For example, when a video stream has been previously encoded using a DCT, run level coding (RLC) and/or variable length coding (VLC) techniques, the RLC and/or the VLC codes are decoded by performing an inverse RLC and/or VLC to obtain the blocks of quantized DCT frequency coefficients. Then, using a new value of a quantization matrix and/or a quantization scale, the quantized DCT frequency coefficients are re-quantized based on the new values of the quantization matrix and/or the quantization scale. After the DCT frequency coefficients have been thus re-quantized, they are re-encoded using RLC and/or VLC coding techniques. By re-quantizing the DCT frequency coefficients more coarsely, encoding the re-quantized DCT frequency coefficients requires fewer bits. As a result, the overall bit rate of the transcoded video stream is reduced and resources such as storage space and network bandwidth are more optimally utilized.

Another aspect of the present invention enables a user to define the quality of the video stream, for example, by selecting a video stream bit rate. In other situations, the quality of the video stream is dependent on the amount of memory available to store the video stream, which is limited in some cases. The desired bit rate may be realized by relying on the current bit rate and a current quantization level. By measuring the current bit rate, the amount of memory required to store a video stream may be determined. If the current bit rate will cause the available or specified memory to be used too quickly, then the current bit rate is changed or reduced by altering the quantization level. Because the bit rate has been reduced in this manner, the available or specified storage can be accommodated.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
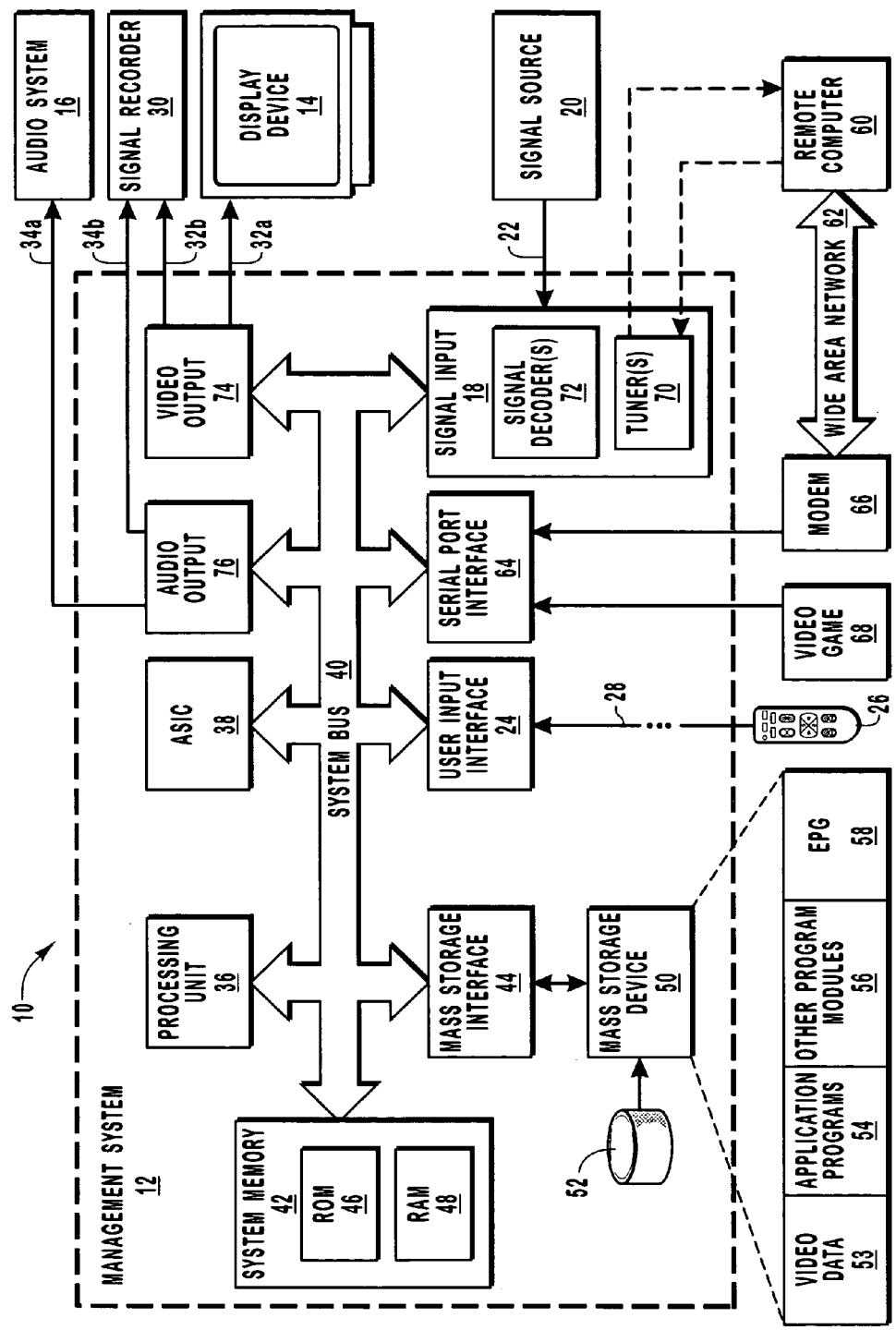
FIG. 1 illustrates an exemplary system that provides a suitable operating environment for the present invention.

The present invention is discussed with respect to MPEG streams and to compression techniques involving a Discrete Cosine Transform (DCT). It is understood that the systems and methods described herein also apply to other transforms (wavelet, for example) that are followed by quantization. Thus, "transform," as used herein, is not limited to DCT but can be applied to other transforms, such as wavelets and the like.

In MPEG, the quantized DCT frequency coefficients are determined by dividing the DCT frequency coefficients by some value. The factors by which the DCT frequency coefficients are divided include values stored in one or more quantization matrices and a quantization scale factor. Different quantization matrices and quantization scales can be provided for chrominance blocks, luminance blocks, intra blocks, non-intra blocks and the like. "Quantization level," as used herein, refers to quantization matrices, quantization scales, ratios between quantization matrices, ratios between entries in the quantization matrices, ratios between quantization scales and the like. The ratios between quantization matrices and quantization scales include ratios between new values of the quantization matrices and/or scales and old or current values of the quantization matrices and/or scales.

As previously described, transcoding a transport or video stream is often a difficult process that frequently involves complex computations such as converting significant amounts of data to and from the frequency domain as the video stream is completely decoded and re-encoded. The complexity of transcoding a video stream is also increased when compensation is performed for changes in the reference frames which were caused as the reference frames were transcoded. The present invention provides low complexity systems and methods for non-compensated re-quantization of a transport or video stream. According to one aspect of the present invention, the complexity of transcoding the video stream is reduced by using the current quantization level and current bit rate of the video stream.

More specifically, the DCT frequency coefficients of an original encoded video stream are re-quantized without computing an inverse DCT. In some cases, an inverse quantization is also not performed to transcode the original coded video stream. The DCT frequency coefficients are re-quantized by updating a quantization matrix and a quantization scale associated with the macroblock, frame, or slice level of the video stream. As the bit rate of the video stream can be altered by updating parameters such as the quantization matrix and/or the quantization scale, the quality of the video stream can also be controlled automatically or by a user. Further, the available bandwidth for the video stream and the storage required to store the video stream may be optimally utilized by transcoding the video stream.

The present invention extends to both methods and systems for transcoding a video stream using both software and/or hardware. The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable storage media having stored computer-executable instructions or data structures stored thereon. Such computer-readable storage media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

FIG. 1 and the corresponding discussion are intended to provide a general description of an exemplary environment in which the invention may be implemented. In the discussion, reference is made to a system that may be used for displaying and/or recording programming. A system may be a display unit, such as a television screen, coupled to a processing device for performing the data processing steps disclosed herein, or may include any number of interconnected consumer electronic devices, one or more of which may have a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Also for purposes of this description and in the claims, the term "programming" includes both the viewable portions of moving image data and its associated sound data. However, the teachings of the present invention are not limited to any specific physical embodiment, but can be used in any application in which originally compressed data may need to be further compressed to achieve some designated bit rate or compression ratio.

In one embodiment, the present invention is implemented in a system that uses a conventional television screen or other display unit to display information and includes a set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

FIG. 1 illustrates a system 10 that includes a management system 12, a display device 14 and an audio system 16. Management system 12 may be a set-top box or Internet terminal that has been adapted to perform the operations disclosed herein. Management system 12 may be integrally positioned with or separate from display device 14, which may be a high definition television display, a standard television display, a flat panel display, a projection device, a high definition television display, a computer monitor, or any other device capable of displaying viewable video image data. Audio system 16 may be a speaker, a stereo system, or any device capable of emitting sound data, and similarly may be integrally positioned with or separate from display device 14.

Management system 12 includes a signal input 18, which receives programming from a signal source 20. The programming is transmitted from signal source 20 to signal input 18 via a programming input line 22, which can be a cable or optic connection, a terrestrial antenna system, a satellite system, or any device or system capable of transmitting programming to home management system 12.

The signal source 20 may be either a single channel signal source or a multiple channel signal source. Examples of the signal source 20 include a VCR, a DVD, and the like. In addition, the signal source 20 includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like. The programming or signals received from the signal source 20 include transport streams, video streams, compressed video streams, and the like.

While FIG. 1 illustrates system 10 as having a single programming input line 22 and a single signal source 20, there can instead be a plurality of programming input lines that transmit programming from a plurality of signal sources. In such embodiments, the system 10 may receive the programming from one signal source or from a plurality of signal sources at a time.

Management system 12 also includes a user input interface 24, which receives input from an input device 26, such as a remote control, keyboard, microphone, or any other device capable of generating electronic instructions for management system 12. Input device 26 is communicatively coupled to management system 12 over an input link 28 so as to enable such control. Input device 26 generates electronic instructions over input link 28 in response to preprogrammed data or in response to a viewer pressing buttons on input device 26. Input device 26 may also control Web browser software within management system 12 as when management system 12 is a set-top box or an Internet terminal that has been adapted to perform the operations disclosed herein. For instance, input device 26 may be programmed to turn on home entertainment system 10 and to tune management system 12 to a channel.

FIG. 1 illustrates a signal recorder 30, which is capable of receiving video and/or audio data and recording the data on a storage medium. Video signals are transmitted to signal recorder 30 and/or display device 14 by video image link 32, examples of which include a radio-frequency ("RF") link, an S-video link, a composite link, or any other equivalent form of video image link. Similarly, audio link 34 transmits audio data from management system 12 to audio system 16 or to signal recorder 30.

The operation of management system 12 is controlled by a central processing unit ("CPU"), illustrated as processing unit 36, which is coupled to an application-specific integrated circuit ("ASIC") 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user interface 24 and signal input 18. Processing unit 36 executes software designed to implement features of management system 12 including features of the present invention. ASIC 38 contains circuitry that is used to implement certain functions of management system 12. Instructions, data, and other software useful for the operation of processing unit 36 and ASIC 38 may be stored in the system memory 42, such as in read-only memory ("ROM") 46 and/or in random-access memory ("RAM") 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computer-readable instructions or data, including application programs 54, other program modules 56, and an electronic programming guide ("EPG") 58, which specifies the broadcast times and channels of programs can be stored in mass storage device 50. Mass storage device 50 can also be used to record video data 53, such as a transport stream or a video stream.

In the embodiment where management system 12 is associated with the Internet, management system 12 communicates with a remote computer 60 via a wide area network ("WAN") 62 by including a serial port interface 64 that is interposed between the system bus 40 and a modem 66, a wireless link, or other means for establishing communications over a WAN that may be internal or external to management system 12. Management device 12 is also capable of transmitting information via the Internet by direct-dial communication over standard telephone lines, or by using any other available communication medium.

While serial port interface 64 may be utilized to connect a modem 66 for communicating across a WAN, serial port interface may also be utilized to connect other consumer electronic devices, such as video game 68, and/or various input devices, such as a keyboard (not shown) or joystick (not shown), to management device 12.

Referring now to signal input 18, if the signal on programming input line 22 includes multiple channels, a tuner 70 included in signal input 18 tunes to a selected channel in the signal. Multiple tuners 70 can be used to provide enhanced viewing features, such as picture, recording one channel while viewing another, and recording a plurality of channels simultaneously. A signal decoder 72 converts video data from an analog format to a digital format, or from a digital format to an analog format, in the event that ASIC 38 and tuner 70 employ different formats. Signal decoder 72 also decodes or transcodes video data from a compressed video format (e.g., MPEG). In embodiments where the management system 12 includes multiple tuners 70, management system 12 may also include multiple signal decoders 72 to perform the operations disclosed herein. Management system 12 also includes a video output 74 and an audio output 76.

While FIG. 1 and the corresponding discussion above provide a general description of a suitable environment in which the invention may be implemented, it will be appreciated that the features of the present invention disclosed herein may be practiced in association with a variety of different system configurations.

An analog video signal is typically digitized using sampling structures that are often represented by macroblocks, where each macroblock represents pixel data. The macroblocks typically separate the various luminance and chrominance pixel data into separate blocks. Exemplary macroblock structures include 4:2:2, 4:4:4, 4:2:0, and 4:1:1 macroblock structures where the first number relates to the luminance pixel data and the other numbers relate to the chrominance pixel data. The 4:2:0 macroblock structure, for example, includes four 8×8 blocks of luminance pixel data and their associated 8×8 chrominance (Cb and Cr or U and V) blocks. Thus, a 4:2:0 structure includes four Y blocks, one Cb (U) block and one Cr (V) block. The human eye is more sensitive to changes in brightness than in hue and in some macroblock structures, some of the chrominance values (Cb and Cr) are often discarded.

Figure 2:
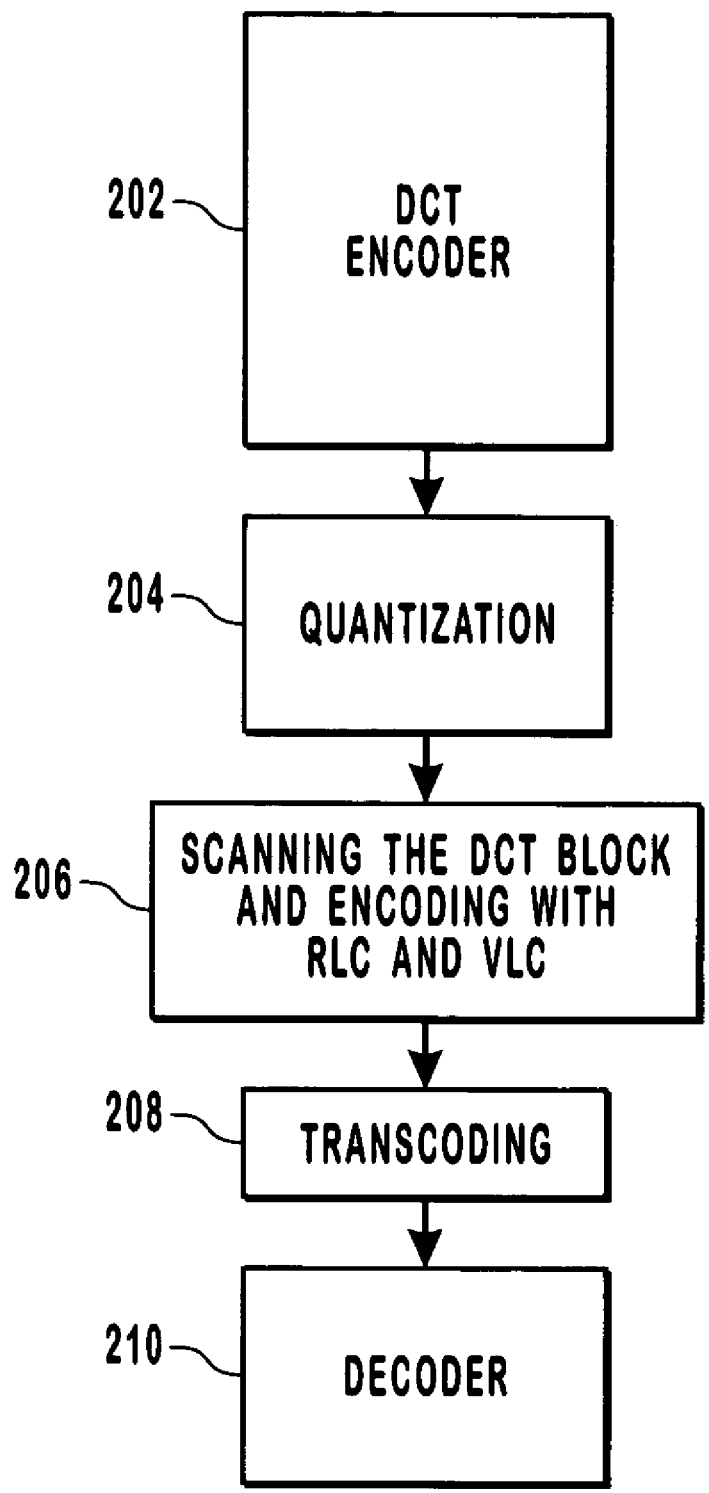
FIG. 2 is a block diagram that describes the compression of a video stream.

FIG. 2 is a block diagram that describes the compression of a video stream after the video stream has been organized into macroblocks, which initially represent spatial pixel data. Thus, FIG. 2 begins with a Discrete Cosine Transform (DCT) encoder 202. Generally stated, the DCT encoder 202 converts spatial data to frequency data. More specifically, the DCT encoder 202 coverts the blocks of pixel data into corresponding blocks of frequency coefficients. Thus, each 8×8 block of pixel data is converted into an 8×8 block of frequency coefficients.

At this point, the compression of the video stream is effectively lossless except for finite-precision effects in the computation of the forward and inverse DCT. The loss associated with the compression of a video stream usually begins to occur when the frequency coefficients in the DCT block are quantized. While quantization (204) of the blocks of frequency coefficients causes data or information to be lost, quantization aids the transmission of the video stream by reducing the number of bits that are actually transmitted.

During quantization (204) of the blocks of frequency coefficients, each frequency coefficient is divided by a number typically greater than one to produce quantized frequency coefficients that are smaller than the original values. As previously stated, the numbers used to quantized the blocks of frequency coefficients include the quantization scale and/or the values located in the quantization matrices. After quantization (204), many of the frequency coefficients become zero or can be rounded to zero. It is understood that each individual frequency coefficient in the blocks of frequency coefficients may be divided by a different number.

Next, the quantized blocks of frequency coefficients, many of which are now zero or have been rounded to zero, are scanned (206) using, for example, a zig zag pattern through each 8×8 block. This method of scanning the coefficients is typically chosen because it tends to group together the zero coefficients that are present in the DCT block of quantized frequency coefficients. Then, the scanned DCT frequency coefficients are encoded using run level coding (RLC) and variable length coding (VLC) techniques (206). RLC typically replaces a string of frequency coefficients, all but the last one having a value of zero, with a small token that lists the number of times that zero is repeated and the value of the non-zero coefficient. The number of times that zero is repeated may be zero for encoding a non-zero coefficient with no zero coefficients preceding it. VLC coding achieves more compression by assigning shorter codes to those values that occur most often. The video stream has now been compressed and may be transmitted. As described previously, the bit rate of this video stream can still be large and may consume too much bandwidth or too much storage.

The present invention therefore provides systems and methods for transcoding the video stream such that the bit rate of the video stream is reduced. Transcoding (208) in accordance with the teachings of the present invention provides significant advantages. Primarily, the systems and methods of the present invention are computationally inexpensive and can be performed in real time. Another advantage of the present invention is the ability to transcode the video stream based on the bit rate of the video stream rather than the activity or changes that occur from one macroblock to the next. The ability to quickly alter the bit rate enables the present invention to optimally accommodate computational, bandwidth, and storage constraints.

After a video stream has been transcoded, it can be stored in memory such as on a hard disk. Alternatively, the video stream may be decoded (210), which includes decoding the RLC and VLC schemes as well as performing an inverse DCT to obtain pixel data from the re-quantized frequency coefficients. The decoded pixel data will not usually be equal to the original pixel data because the quantization process was lossy.

While FIG. 2 describes how a transport or video stream is encoded, transcoded and decoded with respect to MPEG and DCT, FIG. 2 can also be applied to other compression schemes. For example, a signal can be transformed using wavelets instead of DCT. In this case, the resulting signal may also be quantized and encoded. The systems and methods described herein can also apply to such a stream or signal. Thus, the quantized wavelet stream can be re-quantized such that the bit rate is reduced.

Figure 3:
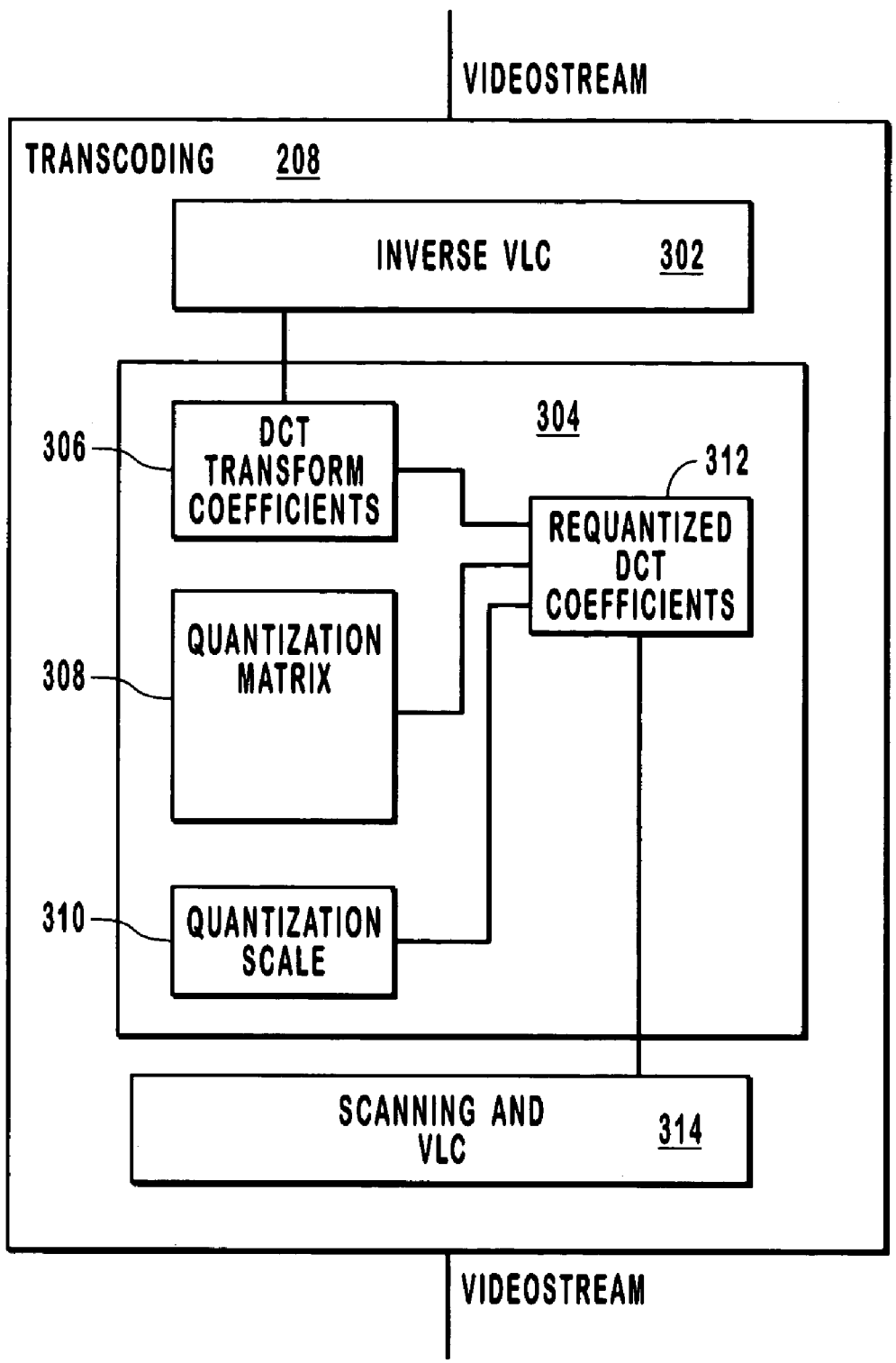
FIG. 3 is a block diagram that more fully depicts how a video stream is transcoded in accordance with the present invention.

FIG. 3 is a block diagram that illustrates an exemplary system and method for transcoding a video stream. At block 302, an inverse VLC and/or RLC is performed on the video stream. Decoding the VLC and/or the RLC codes is performed to obtain the quantized frequency coefficients that are included in a particular DCT block of frequency coefficients. Decoding the VLC and RLC codes thus provides access to the quantized DCT frequency coefficients.

The quantized DCT frequency coefficients of the video stream are available for re-quantization at block 304 after the inverse VLC and/or RLC is performed. The updated or new quantization matrix and/or quantization scale, the ratio between the new quantization matrix and the old quantization matrix, and the ratios between the new quantization scale and the old quantization scale can be pre-computed and stored in a lookup table such that they may be looked up when necessary. The LUT, quantization matrix, quantization scale, matrix ratios and scale ratios are typically updated once per frame. In general, the quantization level can be updated at various intervals including, but not limited to, once per slice (a series of macroblocks), one per frame, one per macroblock, and the like, although updating the quantization level may not be necessary in some circumstances. For example, the current bit rate may be satisfactory and it is a not necessary to update the LUT, the quantization matrix, and the quantization scale.

After the quantization matrix 308 and/or the quantization scale 310 have been adjusted or updated, they are combined with or applied to the quantized DCT frequency coefficients to create a new block of re-quantized DCT frequency coefficients at block 312. Typically, the quantization matrix 308 and/or the quantization scale 310 are updated or adjusted such that the resulting block of re-quantized DCT frequency coefficients are more coarse. The actual numbers in the quantization matrix and/or the quantization scale can be determined by a user.

Because the re-quantized DCT frequency coefficients are more coarse, it is likely that more zeros will exist in each block of re-quantized DCT frequency coefficients. Because more zeros are present in the new DCT block, it is likely that it can be encoded using fewer bits, which reduces the overall bit rate of the video stream.

After the quantized DCT frequency coefficients have been re-quantized, they are scanned and re-encoded using VLC and/or RLC techniques as previously described. The resulting video stream has a lower bit rate because fewer bits are usually necessary to encode the re-quantized DCT frequency coefficients. Also, the resulting video stream consumes less bandwidth and consumes less storage space if the transcoded video stream is committed to memory.

Figure 4:
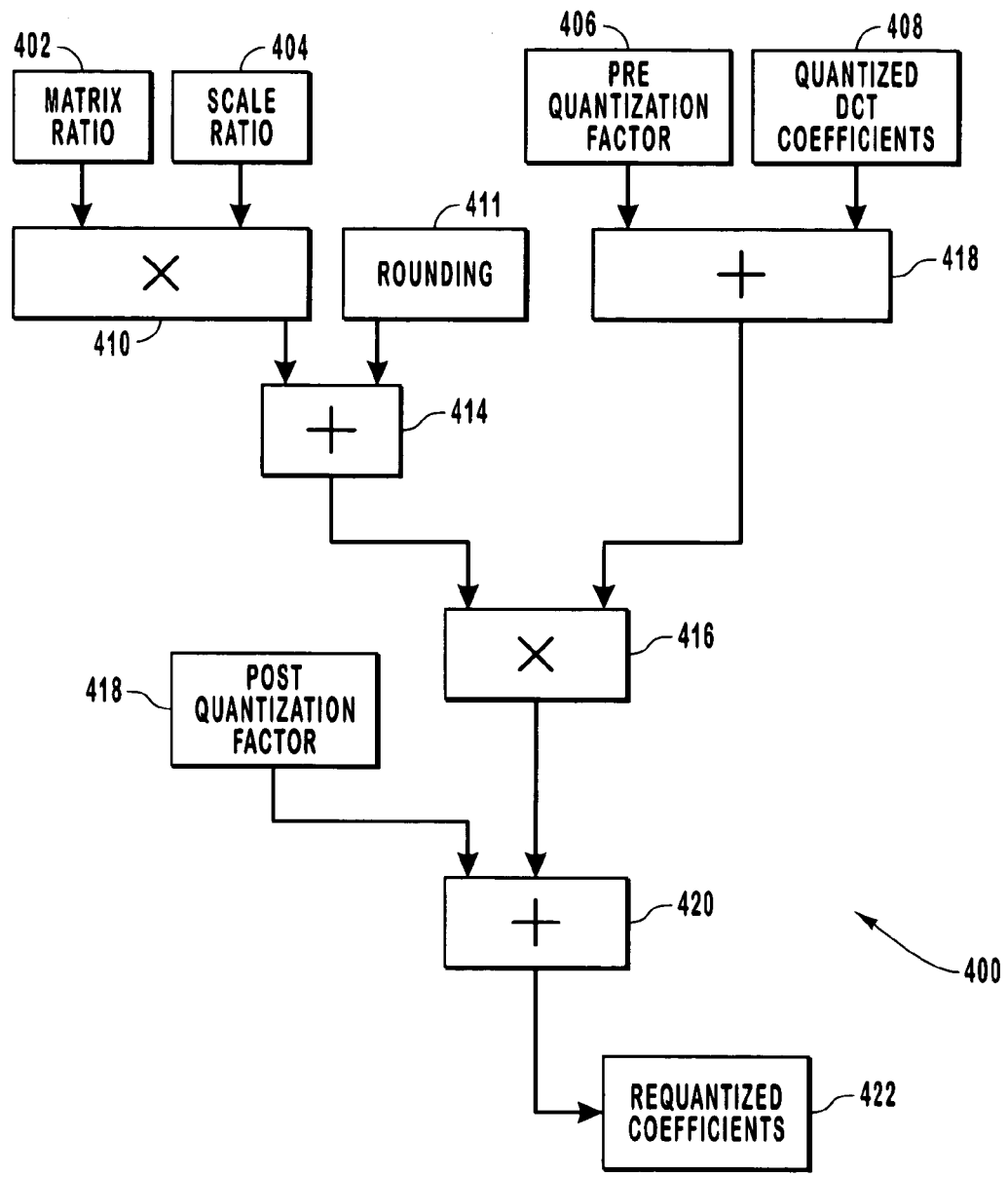
FIG. 4 is a block diagram illustrating a system for transcoding a video stream using multipliers and rounding.

FIG. 4 is a block diagram of a system used to re-quantize the DCT coefficients that are obtained from a video stream as previously described. The matrix ratio 402 represents a ratio between a new value of the quantization matrix (QMATnew) and a current value of the quantization matrix (QMATold).

The quantization matrix contains multiple values, each of which was used to quantize a corresponding position in the block of DCT frequency coefficients. The matrix ratio 402 is represented as:

QMATnew[i][j]/QMATold[I][j].

The scale ratio 404 represents a ratio between a new value of a quantization scale (MQUANTnew) and a current value of the quantization scale (MQUANTold), or MQUANTnew/MQUANTold.

The matrix ratio 402 and the scale ratio 404 are multiplied at block 410 to produce a value that will be used to re-quantize the quantized DCT frequency coefficients that have been obtained from the video stream. In one embodiment, a pre-quantization factor is to the quantized DCT frequency coefficients 408 to account for the non-linearity of the original quantization as shown in FIG. 4. The pre-quantization factor 406 is often varied according to a magnitude of the quantized DCT frequency coefficient. In addition, the value of the pre-quantization factor is also determined according to whether an intra or a non-intra block is being transcoded because the inverse quantization of intra blocks, as specified by MPEG, is different than the inverse quantization of non-intra blocks. Optimum values for both the pre-quantization factor 406 and the post-quantization factor 418 can be theoretically determined for both intra and non-intra blocks when the distribution of frequency coefficients is uniform. In the case where the distribution of frequency coefficients is not uniform, the pre-quantization factor 406 and the post-quantization factor 418 can be determined empirically. Usually, the distribution of the quantized DCT frequency coefficients is unknown and the empirically derived pre-quantization factor 406 and post-quantization factor 418 will be used for both intra and non-intra blocks.

The pre-quantization factor represented at block 406 and the post quantization factor 418 are selected using a multiplexer. In one example, the pre-quantization factor for intra blocks is 0.0 and the post quantization factor 418 for intra blocks is 0.5. For non-intra blocks, the following table is an example of exemplary pre quantization factors and post quantization factors. It is understood that these values are exemplary and that the present invention is not limited to these specific values. The table presents a case, which represents a magnitude of the quantized DCT coefficient and the corresponding pre and post quantization factors. The present table presents eight ranges, but more or less ranges can also be selected for non-intra blocks.

| Case | Pre quantization Factor | Post quantization Factor |
| --- | --- | --- |
| 0 < coefficient ≦ 2 | 0.109375 | 0.40625 |
| 2 < coefficient ≦ 4 | 0.203125 | 0.3125 |
| 4 < coefficient ≦ 8 | 0.234375 | 0.234375 |
| 8 < coefficient ≦ 16 | 0.265625 | 0.15625 |
| 16 < coefficient ≦ 32 | 0.390625 | 0.109375 |
| 32 < coefficient ≦ 64 | 0.375 | 0.09375 |
| 64 < coefficient ≦ 128 | 0.421875 | 0.0625 |
| 128 ≦ coefficient | 0.453125 | 0.046875 |

In this exemplary embodiment, block 414, the output of block 410 is rounded using rounding 411 and then multiplied against the rounded DCT frequency coefficients in block 416. The output of block 416 is the preliminary re-quantized DCT frequency coefficients. At block 420, a post quantization factor 418 is combined with the output of block 416 to produce the re-quantized DCT frequency coefficients 422. The pre-quantization factor 406 and the post quantization factor 418 are chosen to account for the non-linearity that is introduced when the original DCT frequency coefficients are quantized. The rounding, which is accomplished by the pre-quantization factor 406, rounding 411, and post quantization factor 418 are chosen to ensure that the re-quantized frequency coefficients will ultimately render an image that is minimally distorted from the original image. The present invention does not exclude other rounding techniques or does not require that any rounding be used at all.

Choosing the pre-quantization factor 406 and the post quantization factor 418 is often dependent on the original quantization level because the distribution of the re-quantized frequency coefficients is a result of multiplying the original quantized frequency coefficients by the matrix ratio 402 and by the scale ratio 404. Because the multiplications have finite precision and because the distribution of the original frequency coefficients is typically unknown, a quantization error is often incurred. The quantization error is accounted for, in one example, by using the empirically derived pre-quantization factor 406 and post-quantization factor 418.

After the re-quantized DCT frequency coefficients have been computed, they are re-encoded using RLC and VLC techniques. The overall result of transcoding the video stream in this manner is that the bit rate has been reduced. FIG. 4 therefore represents the following quantization of the DCT frequency coefficients: Coefficient(new)=[coefficient(old)+ pre-quantization factor]*{[QMAT ratio* MQUANT ratio]+ rounding}+post quantization factor.

A user may determine the new values of the new quantization matrix and the new quantization scale or pre-defined values can be provided. As the potential number of values for the quantization matrix is limited (in one example, only 256 values are possible), the ratio of the new quantization matrix to the current or old quantization matrix is pre-computed. This computation may be repeated, for example, on a per frame basis and is performed for each coefficient in each quantization matrix (luminance, chrominance, intra block, non-intra block). This process can be further simplified by computing the inverses (1/x) for each of the possible values in the quantization matrix to enable the ratio of the new quantization matrix to the old quantization matrix to be generated using a multiply operation instead of a divide operation. In a similar manner, the ratio of the new quantization scale to the current or old quantization scale can also be pre-computed.

Figure 5:
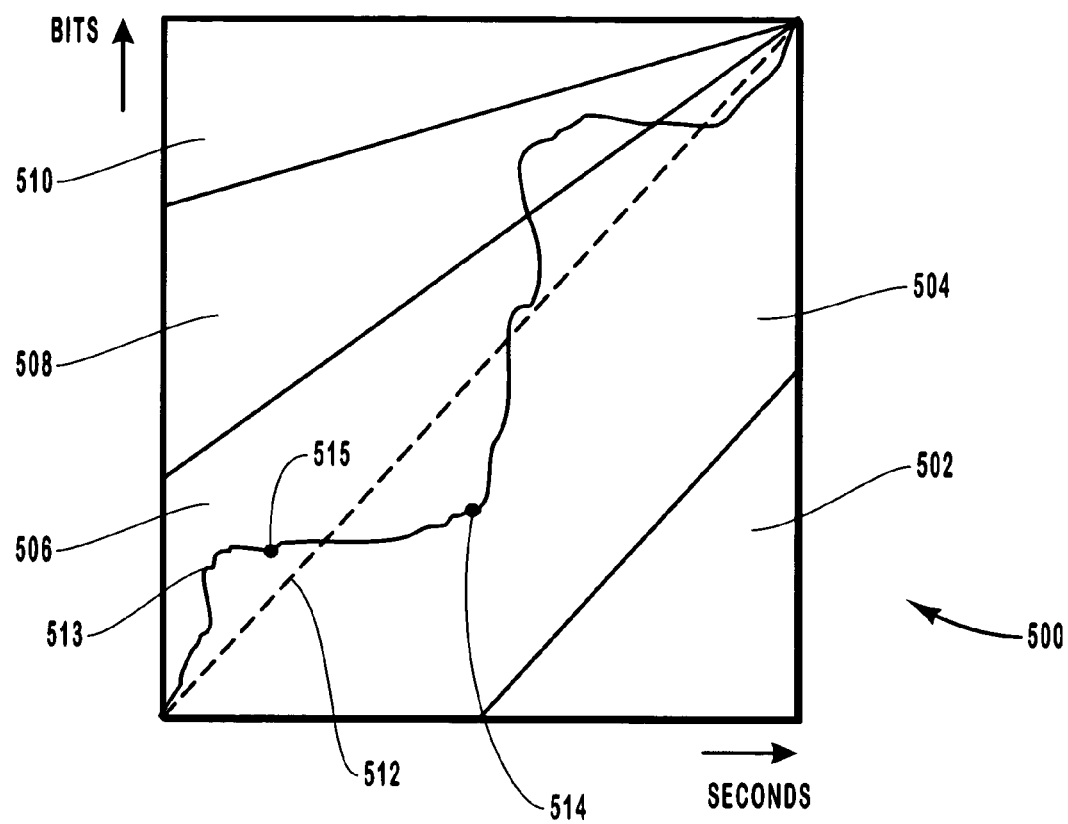
FIG. 5 is a block diagram that used to describe how the bit rate of a video stream can be used in transcoding the video stream in conjunction with a current quantization level.

FIG. 5 is a block diagram that used to describe how the bit rate of a video stream can be used in transcoding the video stream in conjunction with a current quantization level. In fact, the bit rate can be the deciding factor in choosing a new quantization level. FIG. 5 is explained in the context of a video stream that is being stored in the memory, such as a hard disk, of a set top box or of a computer and further illustrates how the number of bits that have been stored within a particular time interval may be used, in conjunction with a present bit rate, to alter the present bit rate to enable more precise control of the number of bits stored in a particular time interval.

Controlling the bit rate of a video stream effectively guarantees that a given amount of memory will be consumed or used in given time interval. Area 500 represents how many bits have been stored within a certain time period. Often, the area 500 is defined by a user who selects how much storage a video stream is allowed to consume. Alternatively, the bit rate can be controlled autonomously such that the bit rate of the video stream is automatically adjusted in order to optimally utilize available resources such as bandwidth and memory.

A user decides to use a particular bit rate, for example, by examining how much storage is available for the video stream, or by considering the available bandwidth. In this manner, a user is able to more effectively use and manage available resources. If the bit rate of a video stream cannot be altered or changed, then there is a potential that the available storage will become full before the video stream is fully recorded. Conversely, the ability to control the bit rate can enable a user to store more data in the available storage space and ensure that the entire video stream is recorded.

The following example assumes that a user desires to store 40 Megabits of the video stream every 10 seconds. In FIG. 5, the y axis corresponds to the number of bits that have been stored or consumed while the x axis corresponds to the amount of time that has passed. The area 500 therefore conveys, in this example, that 40 Mbits will be stored every 10 seconds. The dashed line 512 represents an ideal level of storage for a particular video stream while the line 513 represents how much of the 40 Mbits has actually been consumed at a given time. If the line 513 is above the dashed line 512 then the bit rate is too fast and the 40 Mbits of storage will be consumed before the 10 seconds expires unless the bit rate is altered. On the other hand, if the line 513 is below the dashed line 512, then the bit rate may be allowed to increase.

At point 515 for example, the line 513 is above the dashed line 512 and to continue to record or store the video stream at this rate will consume more than the allotted memory in the specified time interval. The solution is to reduce the bit rate of the video stream. Thus, the video stream is transcoded by altering the quantization scale and/or the quantization matrix as described above such that the bit rate is reduced. The important factors are the current bit rate and the current quantization level of the video stream. This potentially reduces the quality of the video stream, but the memory required to store the video stream can be more precisely managed.

At point 514, the line 513 is below the dashed line 512. In this case, transcoding the video stream may not be necessary as the current bit rate will not cause the available storage to be fully used. If transcoding is not performed, it is likely that the line 513 will rise above the dashed line 512 at a later point, at which time the bit rate will be reduced by the transcoding systems and methods described herein. Alternatively, the coarseness of the transcoding can be reduced such that the line 513 approaches the dashed line 512.

Area 500 is additionally divided into portions 502, 504, 506, 508, and 510. The coarseness of the transcoding, or the degree to which the DCT frequency coefficients are re-quantized may be dependent on which portion of area 500 that the line 513 occupies. For example, if the bit rate causes the line 513 to enter the portion 510 of area 500, then it may be necessary to more coarsely re-quantize the DCT frequency coefficients in order to ensure that, in this example, only 40 Mbits are consumed in 10 seconds. Alternatively, if the line 513 is in the portion 502 of area 500, then the bit rate may be allowed to increase such that the available 40 Mbits are fully consumed. The preceding discussion does not dictate that an exact number of bits must be consumed in a particular time period although it is possible. Rather, controlling the bit rate of a video stream by re-quantizing the frequency coefficients enables the available storage to be managed more precisely and effectively.

Similarly, controlling the bit rate of a video stream can be used to effectively manage or use the available bandwidth. For example, if a particular video stream is consuming too much bandwidth, then the bit rate can be decreased by transcoding the video stream as described herein. Alternatively, the bit rate of a video stream can also be allowed to increase to take advantage of unused or available bandwidth in appropriate circumstances.

The present invention often does not need to do an act or step of performing an inverse quantization on the quantized coefficients. In some instances, an inverse quantization may be performed. However, the more computationally intensive act of performing an inverse DCT or other transform is generally not done when transcoding a transport or video stream.

The present invention has been primarily described with respect to a single video stream, but the systems and methods described herein can be applied, for example, to multiple video streams or to a transport stream. The systems and methods of the present invention can likewise be applied to other compression techniques and is not limited to MPEG.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method implemented by a computing system that receives a transport stream, the transport stream including at least one video stream, wherein the video stream has a bit rate that is too large for available bandwidth or wherein a storage of a set top box cannot store the video stream based on the bit rate, the computing system also including a processor that executes computer executable instruction to implement the method, wherein the method is a method for controlling the bit rate of the video stream in order to accommodate the available bandwidth or the storage of the computing system, the method comprising acts of:

selecting, by the computing system, a new bit rate for the video stream, wherein the new bit rate corresponds to consuming a particular number of bits in a particular time interval;

determining, by the computing system, a current bit rate of the video stream;

altering, by the computing system, a quantization level of the video stream such that the current bit rate is reduced if the current bit rate will cause more than the particular number of bits to be consumed in the particular time interval, wherein altering the quantization level includes at least one of:

an act of computing a matrix ratio between a new quantization matrix and a current quantization matrix of the video stream; or an act of computing a scale ratio between a new quantization scale and a current quantization scale of the video stream; and refraining, by the computing system, from altering the quantization level of the video stream if the current bit rate will cause less than the particular number of bits to be consumed in the particular time interval.

2. A method as defined in claim 1, wherein the act of selecting a bit rate for the video stream is dependent on the bandwidth available to the video stream.

3. A method as defined in claim 1, wherein the act of selecting a bit rate for the video stream is dependent on the storage of the set top box that records the video stream.

4. A method as defined in claim 1, wherein the act of altering the quantization level comprises an act of altering at least one of a quantization matrix and a quantization scale of the video stream.

5. A method as defined in claim 1, wherein the act of altering a quantization level of the video stream such that the current bit rate is reduced if the current bit rate will cause more than the particular number of bits to be consumed in the particular time interval further comprises acts of:

performing an inverse variable length coding (VLC) on the video stream such that original quantized discrete cosine transform (DCT) blocks are known;

re-quantizing the original quantized DCT blocks using at least one of the altered quantization matrix and the altered quantization scale; and performing a variable length coding on the re-quantized DCT blocks such that the bit rate of the video stream is reduced.

6. A method as defined in claim 5, wherein the act of re-quantizing the original quantized DCT blocks occurs without performing an inverse quantization on the original quantized DCT blocks.

7. A method as defined in claim 1, wherein the act of altering the quantization level comprises an act of performing an inverse quantization on the original quantized DCT blocks.

8. A method as defined in claim 1, wherein the act of altering the quantization level comprises an act of transcoding the video stream such that the video stream has a lower bit rate.

9. A method as defined in claim 1, wherein the act of refraining from altering the quantization level comprises an act of refraining from transcoding the video stream.

10. A method implemented by a computing system that receives a transport stream, the transport stream including at least one video stream, wherein the video stream has a bit rate that is too large for available bandwidth or wherein a storage of the computing system cannot store the video stream based on the bit rate, the computing system including a processor that executes computer executable instruction to implement the method for controlling the bit rate of the video stream in order to accommodate the available bandwidth or the storage of the computing system, the method comprising acts of:

determining, by the computing system, a current bit rate and quantization level of the video stream;

determining, by the computing system, at least a high limit and a low limit for a range of acceptable bit rates for the video stream and that are based on a predetermined amount of memory allotted for storing the video stream on a predetermined storage media;

selecting, by the computing system, a decreased bit rate for the video stream that is reduced from the current bit rate upon determining that the current bit rate exceeds at least the high limit and by at least altering the quantization level of the video stream; and selecting, by the computing system, an increased bit rate for the video stream that is increased from the current bit rate upon determining that the current bit rate is less than at least the low limit and by at least altering the quantization level of the video stream.

11. The method recited in claim 10, wherein the method includes the computing system selecting the increased bit rate and wherein altering the quantization level includes at least one of:

computing a matrix ratio between a new quantization matrix and a current quantization matrix of the video stream; or computing a scale ratio between a new quantization scale and a current quantization scale of the video stream.

* * * * *